(12) United States Patent
Yamaguchi

(10) Patent No.: US 11,687,194 B2
(45) Date of Patent: Jun. 27, 2023

(54) OPERATION DETECTION DEVICE

(71) Applicant: KABUSHIKI KAISHA TOKAI RIKA DENKI SEISAKUSHO, Aichi (JP)

(72) Inventor: Syogo Yamaguchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/868,403

(22) Filed: Jul. 19, 2022

(65) Prior Publication Data

US 2023/0029197 A1 Jan. 26, 2023

(30) Foreign Application Priority Data

Jul. 26, 2021 (JP) ................................. 2021-121870

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01)

(58) Field of Classification Search
None
See application file for complete search history.

(56) References Cited

U.S. PATENT DOCUMENTS

| 2014/0192015 A1* | 7/2014 | Yamaguchi | G06F 3/04166 345/174 |
| 2022/0065741 A1* | 3/2022 | Endo | G02B 6/4292 |

FOREIGN PATENT DOCUMENTS

JP 07-129321 A 5/1995

\* cited by examiner

*Primary Examiner* — Stephen T. Reed
(74) *Attorney, Agent, or Firm* — Thomas W. Cole; Calderon Safran & Cole P.C.

(57) ABSTRACT

An operation detection device includes a detection unit to detect a physical quantity changing upon approach or contact of a detected object to or with an operation surface and to output detection information allowing for calculation of coordinates of an approach or contact position of the detected object, and a control unit to, when the physical quantity based on the detection information satisfies a predetermined condition, calculate and set first detected coordinates of the detected object as reference coordinates and does not perform coordinate update when coordinates calculated after the reference coordinates are included in a first region centered at the reference coordinates, and when coordinates calculated after the reference coordinates are outside the first region, set a second region narrower than the first region and perform the coordinate update, and when coordinates calculated after the updated coordinates are included in the second region, not to perform the coordinate update.

7 Claims, 5 Drawing Sheets

3 DETECTION UNIT
4 CONTROL UNIT

3a LOAD DETECTION PORTION
3b ELECTROSTATIC CAPACITANCE DETECTION PORTION
4 CONTROL UNIT

OPERATION DETECTION DEVICE

CROSS-REFERENCE TO RELATED APPLICATIONS

The present patent application claims the priority of Japanese patent application No. 2021/121870 filed on Jul. 26, 2021, and the entire contents of Japanese patent application No. 2021/121870 are hereby incorporated by reference.

TECHNICAL FIELD

The present invention relates to an operation detection device.

BACKGROUND ART

An information input device is known which includes plural electrode wires arranged in X-axis and Y-axis directions and a first detection unit to detect a voltage drop caused by approach of a finger of an operator to the electrode wires (see, e.g., Patent Literature 1).

This information input device detects XY coordinates of a contact position of a fingertip and outputs the coordinates as coordinate data to a computer, etc.

CITATION LIST

Patent Literature

Patent Literature 1: JP H07/129321 A

SUMMARY OF INVENTION

In case of the information input device, voltage drop caused by approach of the finger depends on the size or shape, etc., of the finger. Therefore, if the sensitivity is increased to suit a finger with a small voltage drop, a finger with a large voltage drop is detected even in a hovering state due to the increased sensitivity, so that the coordinates detected during the hovering operation may be unstable to reduce the touch operability.

It is an object of the invention to provide an operation detection device that can suppress the unstableness of coordinates detected during the hovering operation under the increased sensitivity.

According to an aspect of the invention, an operation detection device comprises:

a detection unit to detect a physical quantity changing upon approach or contact of a detected object to or with an operation surface and to output detection information comprising at least information of the physical quantity and allowing for calculation of coordinates of an approach or contact position of the detected object in a coordinate system set on the operation surface; and a control unit to, when the physical quantity based on the detection information satisfies a predetermined condition, calculate and set first detected coordinates of the detected object as reference coordinates and does not perform coordinate update as long as coordinates calculated after the reference coordinates are included in a first region centered at the reference coordinates, and when coordinates calculated after the reference coordinates are outside the first region, set a second region narrower than the first region and perform the coordinate update, and when coordinates calculated after the updated coordinates are included in the second region, not to perform the coordinate update.

Advantageous Effects of Invention

According to the invention, an operation detection device can be provided that can suppress the unstableness of coordinates detected during the hovering operation under the increased sensitivity.

DESCRIPTION OF EMBODIMENTS

Summary of the Embodiments

An operation detection device in the embodiment is generally composed of a detection unit to detect a physical quantity changing upon approach or contact of a detected object to or with an operation surface and to output detection information comprising at least information of the physical quantity and allowing for calculation of coordinates of an approach or contact position of the detected object in a coordinate system set on the operation surface, and a control unit to, when the physical quantity based on the detection information satisfies a predetermined condition, calculate and set first detected coordinates of the detected object as reference coordinates and does not perform coordinate update as long as coordinates calculated after the reference coordinates are included in a first region centered at the reference coordinates, and when coordinates calculated after the reference coordinates are outside the first region, set a second region narrower than the first region and perform the coordinate update, and when coordinates calculated after the updated coordinates are included in the second region, not to perform the coordinate update.

The operation detection device sets the first region which is centered at the coordinates at which the detected object is first detected and which is larger than the second region set thereafter, and the device does not perform coordinate update as long as coordinates are included in the first region. Therefore, unstableness of the coordinates not intended by a user can be suppressed as compared to when such a configuration is not adopted.

First Embodiment (General Configuration of an Operation Detection Device 1)

Figure 1A:
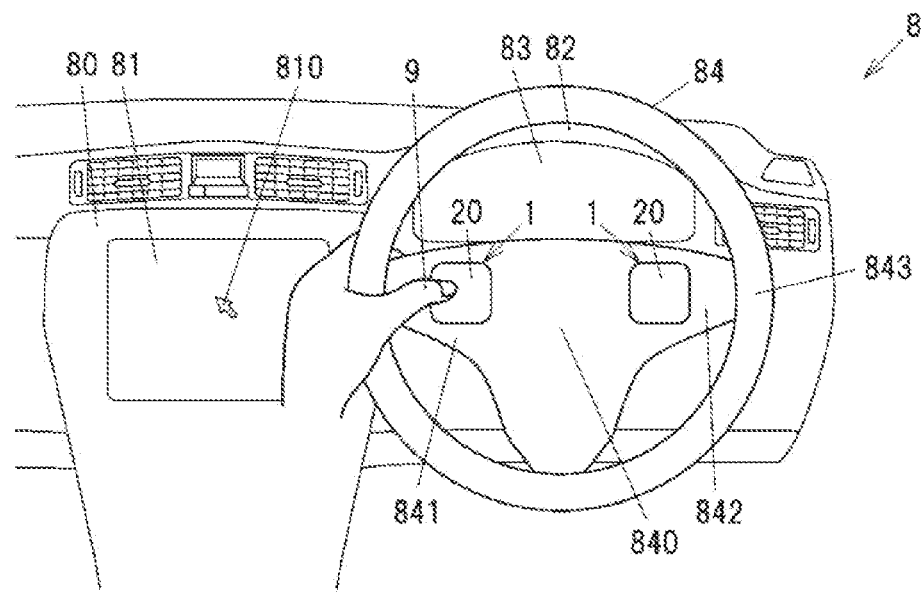
FIG. 1A is a diagram illustrating an example of arrangement of an operation detection device in the first embodiment.
Figure 1B:
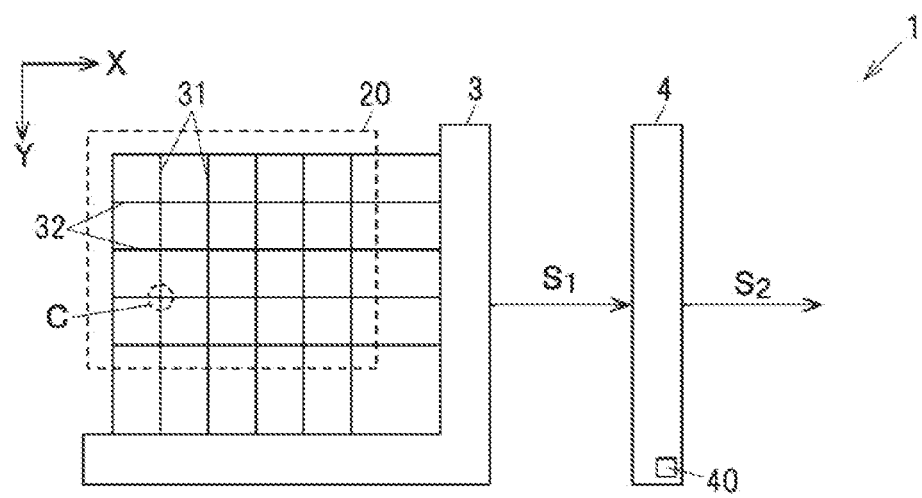
FIG. 1B is an example of a block diagram illustrating the operation detection device.
Figure 2A:
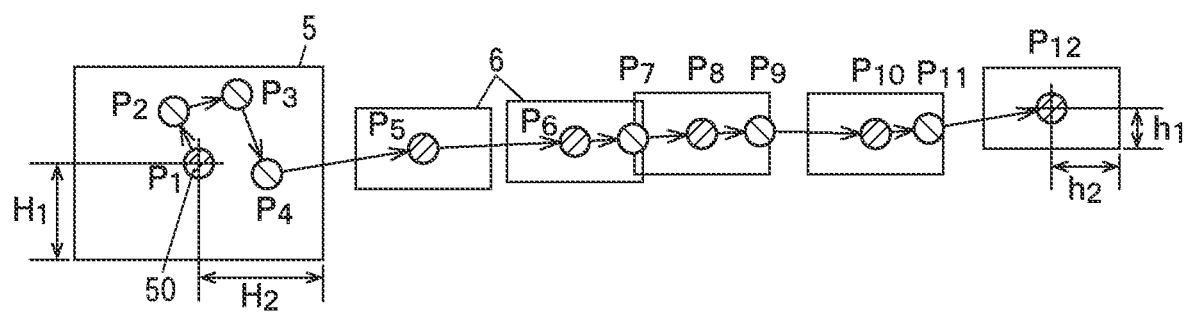
FIG. 2A is an explanatory diagram illustrating an example of first and second regions set by a control unit of the operation detection device in the first embodiment.
Figure 2B:
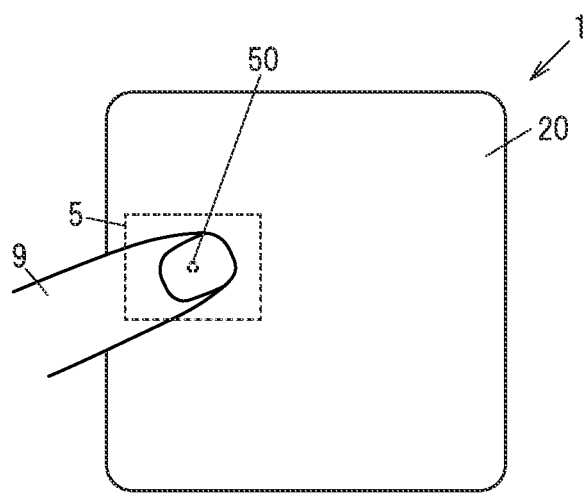
FIG. 2B is a diagram illustrating an example of the first region on an operation surface.
Figure 3A:
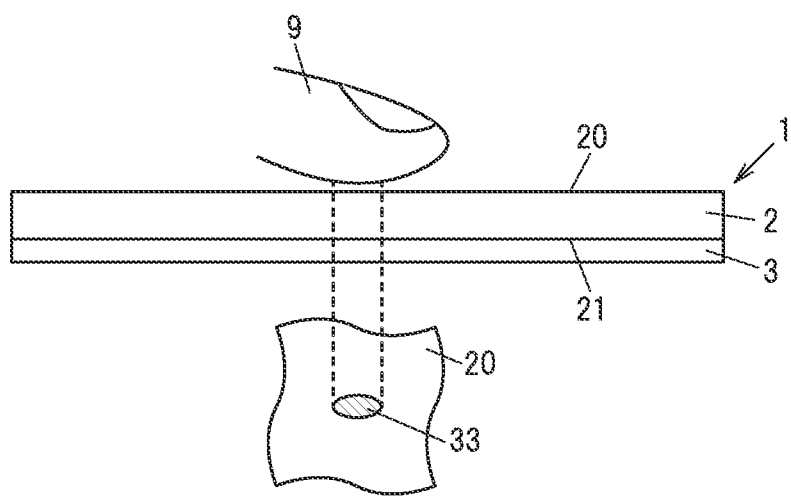
FIG. 3A is a diagram illustrating an example of a detection region detected due to approach of an operating finger to the operation surface in the first embodiment.
Figure 3B:
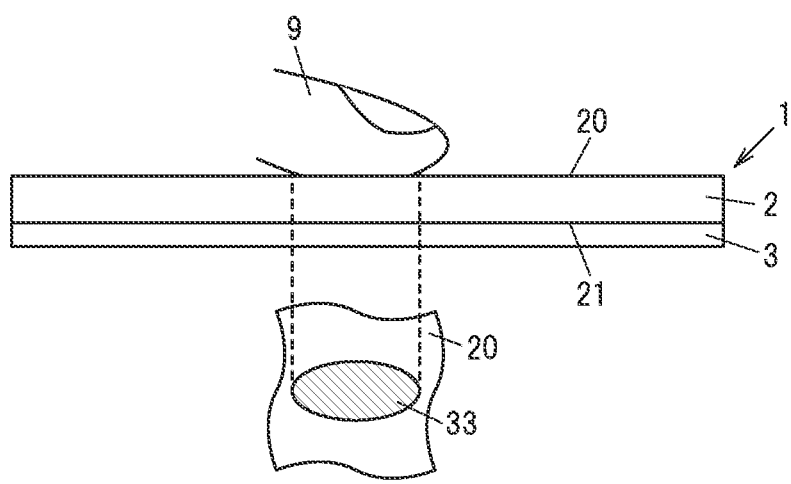
FIG. 3B is a diagram illustrating an example of a detection region detected due to contact of the operating finger with the operation surface.

FIG. 1A is a diagram illustrating an example of arrangement of an operation detection device, and FIG. 1B is an example of a block diagram illustrating the operation detection device. FIG. 2A is an explanatory diagram illustrating an example of first and second regions set by a control unit of the operation detection device, and FIG. 2B is a diagram illustrating an example of the first region on an operation surface. FIG. 3A is a diagram illustrating an example of a detection region detected due to approach of an operating finger to the operation surface, and FIG. 3B is a diagram illustrating an example of a detection region detected due to contact of the operating finger with the operation surface. The detection regions shown in FIGS. 3A and 3B are regions where the operating finger is detected when the operation surface is viewed from above.

In each drawing of the embodiments described below, a scale ratio or shape may be different from an actual ratio or shape. In addition, in FIG. 1B, flows of main signal and information are indicated by arrows.

The operation detection device 1 in the first embodiment is mounted on a vehicle 8 as shown in FIG. 1A and used to operate an in-vehicle device of the vehicle 8, as an example. The operation detection device 1 is designed to allow operation of a cursor 810 and menu items, etc., displayed on a main display 81 on a center console 80 or a sub-display 83 on an instrument panel 82 by the in-vehicle device, as an example. The operation detection device 1 is configured to accept touch operations, tracing operations or tap operations, etc., on an operation surface 20.

The operation detection devices 1 in the first embodiment are arranged on a steering wheel 84, as shown in FIG. 1A. The steering wheel 84 is connected to a steering shaft and includes a base portion 840 on which an alerting device is arranged, a left spoke 841 and a right spoke 842 which are located on left and right of the base portion 840, and a ring portion 843 supported by the left spoke 841 and the right spoke 842.

The operation detection devices 1 are arranged on the left spoke 841 and the right spoke 842. The operation detection device 1 arranged on the left spoke 841 will be mainly described in the first embodiment, but the operation detection device 1 arranged on the right spoke 842 also has the same basic configuration.

As shown in FIGS. 1A to 2B, the operation detection device 1 is generally composed of a detection unit 3 that detects a physical quantity changing due to approach or contact of a detected object to or with the operation surface 20 and outputs detection information $S_1$ including at least information of the physical quantity and allowing for calculation of coordinates of an approach or contact position of the detected object in a XY coordinate system set on the operation surface 20, and a control unit 4 that, when the physical quantity based on the detection information $S_1$ satisfies a predetermined condition, calculates and sets first detected coordinates of the detected object as reference coordinates 50 and does not perform coordinate update as long as coordinates calculated after the reference coordinates 50 are included in a first region 5 centered at the reference coordinates 50, and when coordinates calculated after the reference coordinates 50 are outside the first region 5, sets a second region 6 narrower than the first region 5 and also performs coordinate update, and then does not perform coordinate update as long as coordinates calculated after the updated coordinates are included in the second region 6.

The detection unit 3 in the first embodiment detects capacitance C as the physical quantity, as shown in FIG. 1B. The control unit 4 calculates the reference coordinates 50 based on a detection region 33 as a region where the predetermined condition is satisfied, the predetermined condition being when an amount of change in the capacitance C is not less than a predetermined electrostatic capacitance threshold value 40, as shown in FIGS. 3A and 3B.

The detected object is an operating finger 9 of a user but is not limited thereto and may be a portion of the user's body other than the operating finger 9 or a special tool such as stylus pen as long as its approach or contact with the operation surface 20 causes a change in the capacitance C between it and detection electrodes of the detection unit 3.

(Configuration of the Detection Unit 3)

As shown in FIGS. 3A and 3B, the detection unit 3 is arranged on a back surface 21 side of an operation panel 2, as an example. The operation panel 2 is formed of a resin material and has a plate shape, as an example. The operation surface 20 has a rectangular shape, as an example.

The detection unit 3 in the first embodiment is a mutual-capacitive touch sensor, as an example. As shown in FIG. 1B, the detection unit 3 includes plural X-axis detection electrodes 31 aligned so as to intersect an X-axis, and plural Y-axis detection electrodes 32 aligned so as to intersect a Y-axis.

The X-axis detection electrodes 31 and the Y-axis detection electrodes 32 are formed using a highly conductive metal material such as copper, as an example. The X-axis detection electrodes 31 and the Y-axis detection electrodes 32 are composed of plural rectangular detection electrodes electrically connected in line.

The detection unit 3 is configured to drive the Y-axis detection electrodes 32 in turn and read the capacitance C from the X-axis detection electrodes 31. This detection unit 3 reads the capacitance C for all combinations of the X-axis detection electrodes 31 and the Y-axis detection electrodes 32 and outputs the detection information $S_1$, which is information including this capacitance C, to the control unit 4. The X-axis detection electrodes 31 are readout electrodes and are thus located on the upper side of the Y-axis detection electrodes 32, i.e., closer to the operation surface 20.

For example, the capacitance C shown in FIG. 1B is obtained at an intersection, i.e., a combination, of the fourth Y-axis detection electrode 32 from the top, which is on the drive side, and the second X-axis detection electrode 31 from the left, which is on the readout side. When the operating finger 9 approaches close enough to be detected or comes into contact with the operation surface 20 above the X-axis detection electrode 31 and the Y-axis detection electrode 32, capacitive coupling occurs between the X-axis detection electrode 31 and the operating finger 9 and the capacitance which is detected decreases.

In case of the detection unit 3, when the operating finger 9 approaches or comes into contact with the operation surface 20, the capacitance C at the intersection of the detection electrodes detected the operating finger 9 decreases. From the detection unit 3, an absolute value of a difference from the capacitance C with no touch operation, i.e., an absolute value of the amount of change is output as the detection information $S_1$, as an example. The detection unit 3 in the first embodiment is configured such that the amount of change increases due to approach or contact of the operating finger 9 and the capacitances C at all intersections are periodically output as the detection information $S_1$ to the control unit 4.

(Configuration of the Control Unit 4)

The control unit 4 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. The ROM stores, e.g., a program for operation of the control unit 4. The RAM is used as, e.g., a storage area to temporarily store calculation results, etc. The control unit 4 also has, inside thereof, a means to generate a clock signal and operates based on the clock signal.

The control unit 4 has the electrostatic capacitance threshold value 40. Based on the detection information $S_1$ acquired from the detection unit 3, the control unit 4 compares the amount of change in the capacitance C corresponding to each intersection of the X-axis detection electrode 31 and the Y-axis detection electrode 32, with the electrostatic capacitance threshold value 40. The control unit 4 determines that a region formed of intersections at which the amount of change is not less than the electrostatic capacitance threshold value 40 in the same cycle is the detection region 33, and the control unit 4 calculates the coordinates of the detected operating finger 9 by the weighted average method, etc. In the detection unit 3, the amount of change in the capacitance C may be not less than the electrostatic capacitance threshold value 40 depending on the shape, etc., of the operating finger 9 even if the operating finger 9 is at a distance from the operation surface 20. Therefore, in FIG. 3B, the detection region 33 is slightly larger than the area in contact with the operating finger 9.

The First Region 5 and the Second Region 6

The operation detection device 1 is arranged on the steering wheel 84, as shown in FIG. 1A. Therefore, when the user performs an operation while gripping the ring portion 843, the operating finger 9 tends to be often in contact with the operation surface 20 in a state of laying flat, as shown in FIG. 3B. In this case, the detection region 33 detected by the detection unit 3 is proportional to the contact area between the operation surface 20 and the operating finger 9, is longer in length and width, and has a larger area than w % ben touching the operation surface 20 with a tip of the operating finger 9, since the pulp of the operating finger 9 is in contact with the operation surface 20.

Since the operation detection device 1 is arranged on the steering wheel 84, it is difficult to stabilize contact between the operating finger 9 and the operation surface 20 due to vibration of the vehicle 8 or vibration directly transmitted from the road surface to the steering wheel 84. In addition, if sensitivity is increased, i.e., the electrostatic capacitance threshold value 40 is lowered to detect the operating finger 9 regardless of the size thereof, the operation detection device 1 may detect the operating finger 9 in close proximity to the operation surface 20, not in contact with the operation surface 20, i.e., may detect the operating finger 9 in a floating state, as shown in FIG. 3A.

When detecting approach of the operating finger 9, the operating finger 9 is not in contact with the operation surface 20, hence, the positions of the operating finger 9 and the operation surface 20 and the distance therebetween are not stable, making it difficult to stabilize the shape and formation position of the detection region 33. The coordinates at which the operating finger 9 is detected are calculated based on the detection region 33. Therefore, if the shape and formation position of the detection region 33 are not stable, the coordinates are also not stable, resulting in unstableness of the coordinates. When the operation detection device 1 controls a cursor, etc., based on the coordinates of the operating finger 9, the cursor, etc., moves in a manner unintended by the user since the coordinates are not stable, resulting in reduction of operability.

Also when the user performs a touch operation on the operation surface 20, the shape and position of the detection region 33 are not stabilized since the detection region 33 becomes larger as the operating finger 9 approaches and contact the operation surface 20 and is then flattened as shown in FIGS. 3A and 3B, which may cause unstableness of the calculated coordinates. This unstableness of the coordinates occurs mainly due to a series of approach, contact and flattening of the operating finger 9 as described above and thus occurs in the early stages of detection of the operating finger 9.

Therefore, the control unit 4 sets the first region 5 centered at the coordinates at which the operating finger 9 is first detected due to approach or contact of the operating finger 9. This first region 5 is a region which is centered at the first detected coordinates and has a shape larger than the second region 6. That is, the operation detection device 1 is configured such that when the operating finger 9 is first detected, it sets the first region 5 with a hysteresis width of the coordinates which is increased as compared to the second region 6 having a normal hysteresis width. In FIG. 2A, the first detected coordinates are shown as coordinates $P_1$. FIG. 2 shows from the coordinates $P_1$ to coordinates $P_{12}$. The coordinates are calculated in every scanning cycle of scanning the X-axis detection electrodes 31 and the Y-axis detection electrodes 32. Therefore, the coordinates $P_1$ to the coordinates $P_{12}$ are coordinates for twelve cycles.

The first region 5 includes the first detected coordinates $P_1$ as the reference coordinates 50, as shown in FIGS. 2A and 2B. As an example, the first region 5 is set as a rectangular region which is centered at the reference coordinates 50 and has a vertical length of $2H_1$ and a horizontal length of $2H_2$. The size of the first region 5 is 3 to 12 times the second region 6, as an example. The first region 5 and the second region 6 have a rectangular shape, but the shape is not limited thereto and may be a fan shape corresponding to a movable range of the operating finger 9 when gripping the steering wheel 84.

The first region 5 is provided corresponding to the operation surface 20, as shown in FIG. 2B. When the coordinates at which the operating finger 9 is detected move within the first region 5 shown in FIG. 2B, the control unit 4 regards the coordinates as not moving from the reference coordinates 50 and stops coordinate update.

That is, the control unit 4 is configured to calculate and set the first coordinates $P_1$ of the detected operating finger 9 as the reference coordinates 50, and not perform coordinate update as long as the coordinates calculated after the reference coordinates 50 are included in the first region 5 centered at the reference coordinates 50, as shown in FIG. 2A.

In case of FIG. 2A, the calculated coordinates are obtained in the following order: the coordinates $P_1$, the coordinates $P_2$ upper left diagonal therefrom, the coordinates $P_3$ upper right diagonal from the coordinates $P_2$, and the coordinates $P_4$ lower right diagonal from the coordinates $P_3$, as an example. The coordinates $P_2$ to the coordinates $P_4$ calculated after the reference coordinates 50 are included in the first region 5. Therefore, the control unit 4 does not regard that the operating finger 9 is moving from the coordinates $P_1$, the coordinates $P_2$, the coordinates $P_3$ to the coordinates $P_4$, and the control unit 4 outputs control information $S_2$ indicating that the operating finger 9 stays at the coordinates $P_1$ for four cycles.

The control unit 4 is configured to set the second region 6 narrower than the first region 5 and also update the coordinates when the coordinates calculated after the reference coordinates 50 are outside the first region 5, and then not to perform coordinate update as long as coordinates calculated after the updated coordinates are included in the second region 2.

In FIG. 2A, the coordinates $P_5$ are the coordinates which are calculated after the reference coordinates 50 and are outside the first region 5, as an example. The control unit 4 sets the second region 6 which is centered at the coordinates $P_5$ and is narrower than the first region 5. This second region 6 is a region which is centered at the coordinates $P_5$ detected outside the first region 5 and has a shape smaller than the first region 5. That is, the operation detection device 1 is configured to set the first region 5 with an increased hysteresis width of the coordinates when the operating finger 9 is first detected.

The second region 6 is set as a rectangular region which is centered at the coordinates $P_5$ and has a vertical length of $2h_1$ and a horizontal length of $2h_2$. The vertical length of $2H_1$ of the first region 5 is larger than the vertical length of $2h$ of the second region 6. The horizontal length of $2H_2$ of the first region 5 is larger than the horizontal length of $2h_2$ of the second region 6.

The coordinates $P_6$ calculated in the next cycle after the coordinates $P_5$ are outside the second region 6 centered at the coordinates $P_5$. Therefore, the control unit 4 sets another second region 6 which is centered at the coordinates $P_6$. Since the coordinates $P_7$ are included in the second region 6 centered at the coordinates $P_6$, the control unit 4 does not update the coordinates from the coordinates $P_6$ to the coordinates $P_7$. Likewise, the control unit 4 does not update to the coordinates $P_9$ included in the second region 6 centered at the coordinates $P_5$ and to the coordinates $P_{11}$ included in the second region 6 centered at the coordinates $P_{10}$.

The control unit 4 can suppress unnecessary shifts of the coordinates by setting the first region 5 centered at the first coordinates, and can suppress a decrease in responsiveness at the time of, e.g., operating by moving the operating finger 9 little by little, by setting the second regions 6 smaller than the first region 5.

Here, the control unit 4 is configured to cancel the setting of the first region 5 whben time elapsed since setting the reference coordinates 50 becomes not less than a predetermined time T. As an example, the predetermined time T is 0<T<2 s, preferably 0<T<1 s. The control unit 4 switches from the first region 5 to the second region 6 when the predetermined time T has elapsed since setting the first region 5.

After switching from the first region 5 to the second region 6, the control unit 4 does not generate the control information $S_2$ to control an operation target using the reference coordinates 50 and first coordinates located outside the first region 5, but generates the control information $S_2$ using said first coordinates and next coordinates located outside the second region 6.

In case of FIG. 2A, since the first coordinates located outside the first region 5 are the coordinates $P_5$, the control unit 4 does not generate the control information $S_2$ that reflects changes in coordinates such as speed or distance of shift using the reference coordinates 50 (the coordinates $P_1$) and the coordinates $P_5$. Then, after switching to the second region 6, the control unit 4 generates the control information $S_2$ that reflects changes in coordinates using the coordinates $P_5$ and the coordinates $P_6$, the coordinates $P_6$ and the coordinates $P_8$, the coordinates $P_8$ and the coordinates $P_{10}$, and then the coordinates $P_{10}$ and the coordinates $P_{12}$. Since the control unit 4 does not use the reference coordinates 50 when switching from the first region 5 to the second region 6, sense of strangeness felt by the user, such as large shift of the coordinates, can be suppressed.

As a modification, when switching from the first region 5 to the second region 6, the control unit 4 may generate the control information $S_2$ to control the operation target, using the last of the coordinates detected in the first region 5 and the first coordinates detected in the second region 6.

In case of FIG. 2A, since the coordinates $P_4$ is the last coordinates in the first region 5, the control unit 4 may generate the control information $S_2$ that reflects changes in coordinates such as speed or distance of shift using the coordinates $P_4$ and the coordinates $P_5$.

As another modification, when switching from the first region 5 to the second region 6, the control unit 4 may generate the control information $S_2$ to control the operation target, using coordinates which are, among the coordinates included in the first region 5, closest to coordinates of the center of the second region 6 and said coordinates of the center.

Figure 4:
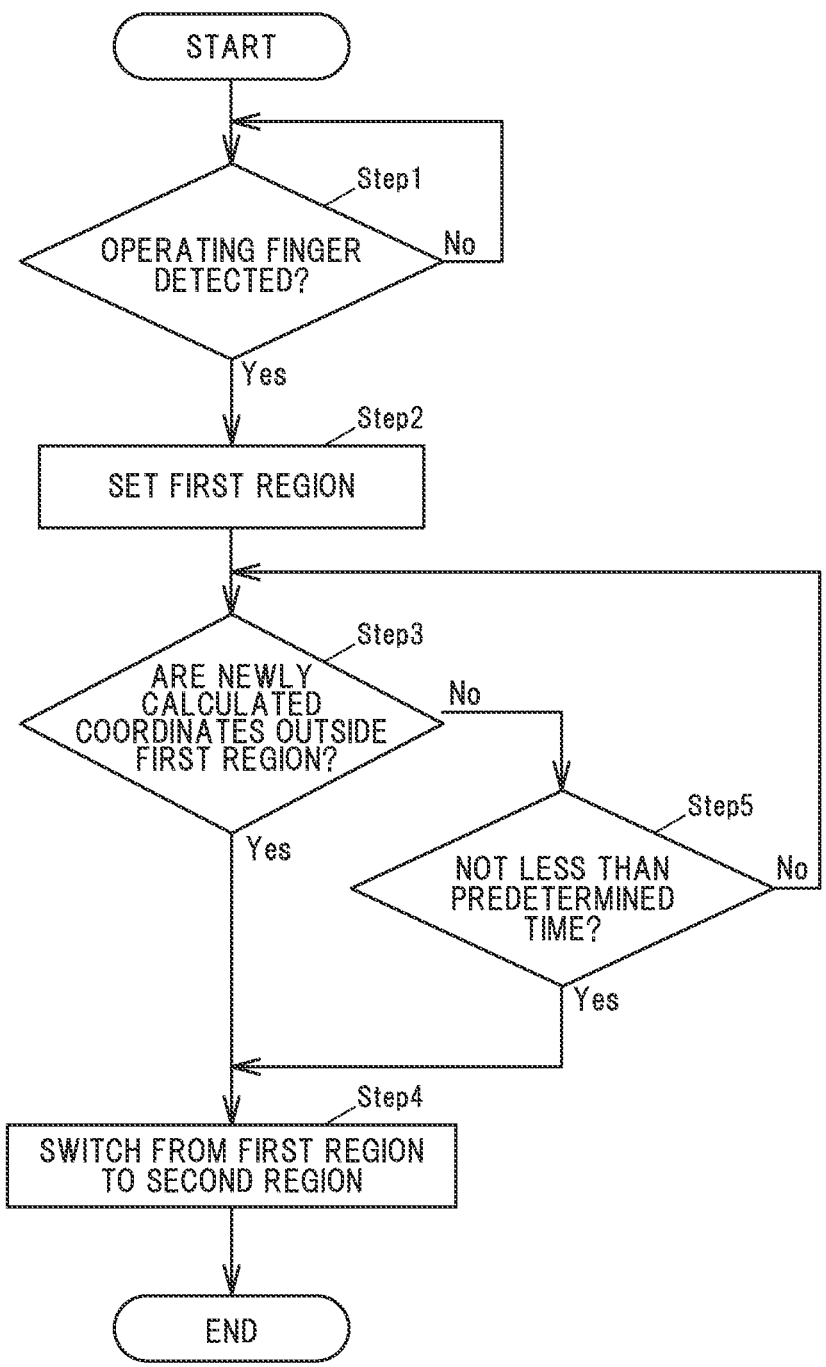
FIG. 4 is a flowchart showing an example of an operation of the operation detection device in the first embodiment.

Next, an example of an operation of the operation detection device 1 in the first embodiment, from setting of the first region 5 to switching to the second region 6, will be described in reference to the flowchart in FIG. 4.

(Operation)

The control unit 4 of the operation detection device 1 monitors whether the operating finger 9 is detected, based on the detection information $S_1$ periodically output from the detection unit 3. When it is "Yes" in Step 1, i.e., when the amount of change in the capacitance C is not less than the electrostatic capacitance threshold value 40 and the operating finger 9 is detected (Step 1: Yes), the control unit 4 calculates coordinates at which the operating finger 9 is detected, sets these coordinates as the reference coordinates 50, and sets the first region 5 centered at these reference coordinates 50 (Step 2). The control unit 4 generates and outputs the control information $S_2$ that includes coordinate information of the reference coordinates 50. If the operating finger 9 becomes no longer detected during when setting the first region 5, the control unit 4 cancels the first region 5 and then monitors whether the operating finger 9 is newly detected.

The control unit 4 calculates coordinates at which the operating finger 9 is detected based on the detection information $S_1$ periodically output from the detection unit 3, and monitors whether these coordinates are outside the first region 5. When new coordinates are included in the first region 5, the control unit 4 does not perform coordinate update. When newly calculated coordinates are located outside the first region 5 (Step 3: Yes), the control unit 4 sets the second region 6 centered at the coordinates located outside, and switches from the first region 5 to the second region 6 (Step 4). The control unit 4 outputs the control information $S_2$ including information of these coordinates and terminates the switching operation from the first region 5 to the second region 6.

After Step 4, when newly calculated coordinates are included in the second region 6, the control unit 4 does not perform coordinate update, and when newly calculated coordinates are located outside the second region 6, the control unit 4 updates the coordinates and sets a new second region 6 which is centered at said coordinates. When the operating finger 9 becomes no longer detected, the control unit 4 cancels the second region 6 and then monitors whether the operating finger 9 is newly detected.

Here, when the newly calculated coordinates are included in the first region 5 in Step 3 (Step 3: No) and also when time elapsed since setting the first region 5 is not less than the predetermined time T (Step 5: Yes), the control unit 4 switches from the first region 5 to the second region 6.

Meanwhile, when the elapsed time has not reached the predetermined time T in Step 5 (Step 5: No), the control unit 4 proceeds the process to Step 3.

Effects of the First Embodiment

The operation detection device 1 in the first embodiment can suppress unstableness of coordinates. In particular, the operation detection device 1 sets the first region 5 larger than the second region 6 at the beginning of detection where the coordinates are likely to become unstable, and the device does not perform coordinate update as long as newly calculated coordinates are included in the first region 5. Therefore, unstableness of the coordinates not intended by the user can be suppressed as compared to when setting regions having the same size from the beginning.

Since unwanted shifts of coordinates due to the unstable state at the beginning of operation can be suppressed by setting the first region 5 centered at the first coordinates and a decrease in responsiveness at the time of, e.g., operating by moving the operating finger 9 little by little can be suppressed by setting the second regions 6 smaller than the first region 5, operability of the operation detection device 1 is improved as compared to when such a configuration is not adopted.

When the user performs a touch operation on the operation surface 20, the shape and position of the detection region 33 are not stabilized since the detection region 33 becomes larger as the operating finger 9 approaches and contact the operation surface 20 and is then flattened, hence, unstableness of the calculated coordinates is likely to occur. Since the operation detection device 1 sets the first region 5 which is larger than the second regions 6 at the beginning where the coordinates are likely to become unstable, unstableness of the coordinates in the initial stage of detection can be effectively suppressed, as compared to when such a configuration is not adopted.

Second Embodiment

The second embodiment is different from the first embodiment in that a load detection portion and an electrostatic capacitance detection portion are provided as the detection unit.

Figure 5A:
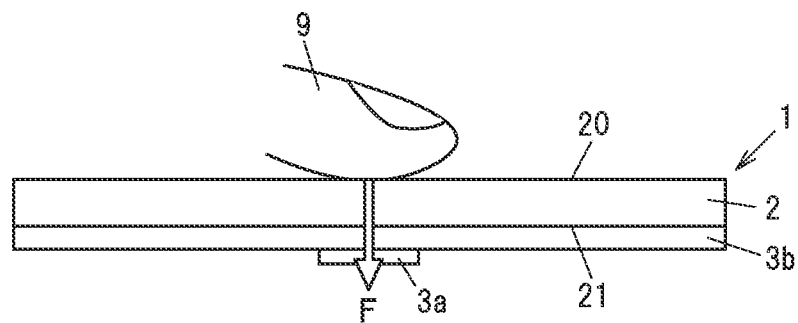
FIG. 5A is a diagram illustrating an example of the operation detection device in the second embodiment.
Figure 5B:
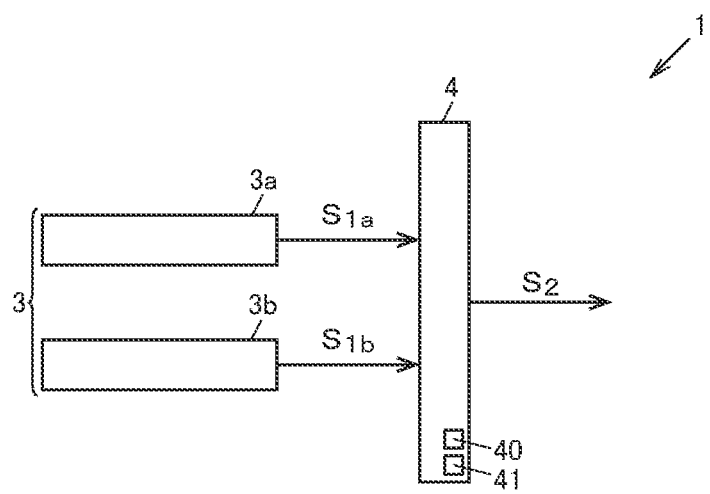
FIG. 5B is an example of a block diagram illustrating the operation detection device.

FIG. 5A is a diagram illustrating an example the operation detection device, and FIG. 5B is an example of a block diagram illustrating the operation detection device. In the embodiment described below, portions having the same functions and configurations as those in the first embodiment will be denoted by the same reference signs as those used in the first embodiment and the description thereof will be omitted.

The detection unit 3 in the second embodiment has a load detection portion 3a as the first detection portion to detect a load F applied to the operation surface 20 as the physical quantity, and an electrostatic capacitance detection portion 3b as the second detection portion to detect coordinates at which the detected object makes a contact with the operation surface 20, as shown in FIGS. 5A and 5B. The control unit 4 sets coordinates detected by the electrostatic capacitance detection portion 3b as the reference coordinates 50 when the predetermined condition, which is when the load F is not less than a predetermined load threshold value 41, is satisfied.

As show in FIG. 5A, the load detection portion 3a is arranged at the center on the back surface 21 side of the operation panel 2. The number and position of the load detection portion 3a are not limited thereto. The load detection portion 3a is a sensor using a strain gauge, as an example. As shown in FIG. 5B, the load detection portion 3a outputs load information $S_{1a}$, which is information of the measured load F, to the control unit 4.

The electrostatic capacitance detection portion 3b is a mutual-capacitive touch sensor that includes the plural X-axis detection electrodes 31 aligned so as to intersect the X-axis, and plural Y-axis detection electrodes 32 aligned so as to intersect the Y-axis, in the same manner as the detection unit 3 in the first embodiment. The electrostatic capacitance detection portion 3b generates and outputs detection information Sib, which is information of the amount of change in the capacitance C caused by approach or contact of the operating finger 9, to the control unit 4.

The control unit 4 in the second embodiment determines contact of the operating finger 9 with the operation surface 20 and calculates coordinates when the amount of change in the capacitance C detected by the electrostatic capacitance detection portion 3b is not less than the electrostatic capacitance threshold value 40 and also the load F detected by the load detection portion 3a is not less than the load threshold value 41.

The control unit 4 sets the coordinates at which contact is detected as the reference coordinates 50, and sets the first region 5 centered at these reference coordinates 50. Then, when the amount of change in newly obtained capacitance C is not less than the electrostatic capacitance threshold value 40 and the load F is not less than the load threshold value 41, the control unit 4 newly calculates coordinates and stops coordinate update until the coordinates are located outside the first region 5. When the new coordinates are located outside the first region 5, the control unit 4 switches from the first region 5 to the second region 6.

As a modification, the control unit 4 may configured to set the first region 5 according to the first coordinates when the operating finger 9 is first detected by the electrostatic capacitance detection portion 3b, then determine that the operating finger 9 is flattened and stabilized when the load F becomes not less than the load threshold value 41, and switch from the first region 5 to the second region 6.

Effects of the Second Embodiment

The operation detection device 1 in the second embodiment determines contact of the operating finger 9 based on the detection results from the load detection portion 3a and the electrostatic capacitance detection portion 3b. Therefore, as compared to when not including the load detection portion, the operating finger 9 in the hovering state is not detected, and moreover, unstableness of the coordinates is suppressed.

Although some embodiments and modifications of the invention have been described, these embodiments and modifications are merely examples and the invention according to claims is not to be limited thereto. These new embodiments and modifications thereof may be implemented in various other forms, and various omissions, substitutions and changes, etc., can be made without departing from the gist of the invention. In addition, all combinations of the features described in the embodiments and modifications are not necessary to solve the problem of the invention. Further, the embodiments and modifications thereof are included within the scope and gist of the invention and also within the invention described in the claims and the range of equivalency.

REFERENCE SIGNS LIST

1 OPERATION DETECTION DEVICE
3 DETECTION UNIT
3a LOAD DETECTION PORTION
3b ELECTROSTATIC CAPACITANCE DETECTION PORTION
4 CONTROL UNIT
5 FIRST REGION
6 SECOND REGION
20 OPERATION SURFACE
33 DETECTION REGION
40 ELECTROSTATIC CAPACITANCE THRESHOLD VALUE
41 LOAD THRESHOLD VALUE
50 REFERENCE COORDINATES

The invention claimed is:

1. An operation detection device, comprising:
a detection unit that detects a physical quantity changing upon approach or contact of a detected object to or with an operation surface and outputs detection information comprising at least information of the physical quantity and allowing for calculation of coordinates of an approach or contact position of the detected object in a coordinate system set on the operation surface; and
a control unit that, when the physical quantity based on the detection information satisfies exceeds a predetermined threshold that is indicative of the approach or contact of the detected object with the operation surface, calculates and sets first detected coordinates of the detected object as reference coordinates, periodically calculates coordinates of the detected object afterwards but does not perform a coordinate update as long as coordinates of the detected object calculated after the reference coordinates are included in a first region of the operation surface that is centered at the reference coordinates, and when coordinates are calculated after the reference coordinates are outside the first region, sets a second region of the operation surface that is narrower than the first region and performs the coordinate update, and when coordinates calculated after the updated coordinates are included in the second region, does not perform the coordinate update.

2. The operation detection device according to claim 1, wherein after switching from the first region to the second region, the control unit does not generate control information to control an operation target using the reference coordinates and first coordinates located outside the first region, but generates the control information using the first coordinates and next coordinates located outside the second region.

3. The operation detection device according to claim 1, wherein the control unit cancels setting of the first region when time elapsed since setting the reference coordinates becomes not less than a predetermined time.

4. The operation detection device according to claim 1, wherein the detection unit detects capacitance as the physical quantity, and wherein the control unit calculates the reference coordinates based on a region where the predetermined condition is satisfied, the predetermined condition being when an amount of change in the capacitance is not less than a predetermined electrostatic capacitance threshold value.

5. The operation detection device according to claim 1, wherein the detection unit comprises a first detection portion to detect a load applied to the operation surface as the physical quantity, and a second detection portion to detect coordinates at which the detected object makes a contact with the operation surface, and wherein the control unit sets coordinates detected by the second detection portion as the reference coordinates when the predetermined condition is satisfied, the predetermined condition being when the load is not less than a predetermined load threshold value.

6. The operation detection device according to claim 1, wherein after switching from the first region to the second region, the control unit generates control information to control an operation target using last coordinates detected in the first region and first coordinates detected in the second region.

7. The operation detection device according to claim 1, wherein after switching from the first region to the second region, the control unit generates control information to control an operation target using coordinates which are, among coordinates included in the first region, closest to coordinates of a center of the second region and the coordinates of the center of the second region.

* * * * *